(12) United States Patent
Savoor et al.

(10) Patent No.: US 8,224,949 B2
(45) Date of Patent: **\*Jul. 17, 2012**

(54) METHOD AND APPARATUS FOR MANAGING BROADBAND RESIDENTIAL GATEWAYS

(75) Inventors: Raj Savoor, Walnut Creek, CA (US); Steve Sposato, Lafayette, CA (US); Canhui Ou, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 134 days.

This patent is subject to a terminal disclaimer.

(21) Appl. No.: 12/782,789

(22) Filed: May 19, 2010

(65) Prior Publication Data

US 2010/0228605 A1    Sep. 9, 2010

Related U.S. Application Data

(63) Continuation of application No. 11/144,310, filed on Jun. 3, 2005, now Pat. No. 7,747,721.

(51) Int. Cl.
  *G06F 15/173* (2006.01)
(52) U.S. Cl. ...................................... 709/223
(58) Field of Classification Search .................. 709/223
  See application file for complete search history.

(56) References Cited

U.S. PATENT DOCUMENTS

| | | | |
|---|---|---|---|
| 6,487,594 B1 | 11/2002 | Bahlmann | |
| 7,305,469 B2 * | 12/2007 | Leahy et al. | 709/225 |
| 2001/0047349 A1 | 11/2001 | Easty et al. | |
| 2002/0059094 A1 | 5/2002 | Hosea et al. | |
| 2004/0090971 A1 | 5/2004 | Anderson, IV | |
| 2004/0148439 A1 | 7/2004 | Harvey et al. | |
| 2006/0041915 A1 * | 2/2006 | Dimitrova et al. | 725/81 |
| 2006/0212367 A1 | 9/2006 | Gross | |

FOREIGN PATENT DOCUMENTS

| | | |
|---|---|---|
| EP | 1113659 | 7/2001 |
| EP | 1434405 | 6/2004 |
| WO | 9741673 | 11/1997 |
| WO | 0130058 | 4/2001 |
| WO | 0209006 | 1/2002 |
| WO | 2005050378 | 6/2005 |

* cited by examiner

*Primary Examiner* — Brian P Whipple

(74) *Attorney, Agent, or Firm* — Guntin Meles & Gust, PLC; Andrew Gust

(57) ABSTRACT

A broadband residential gateway (BRG) management system (101) has a communications interface (102) coupled to one or more BRGs 120 and one or more content service providers (CSPs)(110), a memory (104), and a processor (106). The processor can be programmed to establish (202) a content profile for each of the BRGs according to one or more attributes of the BRGs and the CSPs, receive (204) a content access request from one or more BRGs, and supply (206) each BRG access to selectable content from one or more of the CSPs according to the content profile.

18 Claims, 3 Drawing Sheets

100

METHOD AND APPARATUS FOR MANAGING BROADBAND RESIDENTIAL GATEWAYS

CROSS-REFERENCE TO RELATED APPLICATIONS

This application is a continuation of U.S. patent application Ser. No. 11/144,310 filed Jun. 3, 2005 by Savoor et al., entitled "METHOD AND APPARATUS FOR MANAGING BROADBAND RESIDENTIAL GATEWAY", which is incorporated herein by reference in its entirety.

FIELD OF THE INVENTION

This invention relates generally to content services, and more particularly to a method and apparatus for managing broadband residential gateways.

BACKGROUND OF THE INVENTION

Broadband residential services has grown significantly over the years. Service providers of broadband services (such as xDSL, and cable) are updating their infrastructure equipment to provide bandwidths which very soon could reach 200 Mbps or higher. Consequently, the trend is to eventually converge data, video, and voice in residences.

Broadband Residential Gateways (BRGs), for instance, are expected to offer consumers wireless (and/or wired) services such as VoIP (Voice over Internet Protocol), high-speed data access, streaming video and/or audio, and content download on demand. BRGs are also expected to be utilized as a central hub for managing locally or remotely residential activities such as lighting, air conditioning, and so on.

The growth of such services gives rise to a need for managing content accessible by BRGs in a manner that is helpful and valuable to consumers and thereby provides a source of revenue for the service provider of the broadband services.

SUMMARY OF THE INVENTION

Embodiments in accordance with the invention provide a method and apparatus for managing broadband residential gateways.

In a first embodiment of the present invention, a BRG management system has a communications interface coupled to one or more broadband residential gateways (BRGs) and one or more content service providers (CSPs), a memory, and a processor. The processor can be programmed to establish a content profile for each of the BRGs according to one or more attributes of the BRGs and the CSPs, receive a content access request from one or more BRGs, and supply each BRG access to selectable content from one or more of the CSPs according to the content profile.

In a second embodiment of the present invention, a BRG management system has a computer-readable storage medium. The storage medium has computer instructions for establishing a content profile for each of the BRGs according to one or more attributes of the BRGs and the CSPs, receiving a content access request from one or more BRGs, and supplying each BRG access to selectable content from one or more of the CSPs according to the content profile.

In a third embodiment of the present invention, a method operates in a content services network having a BRG management system and a plurality of BRGs coupled thereto. The method includes the steps of establishing a content profile for each of the BRGs according to one or more attributes of the BRGs and the CSPs, receiving a content access request from one or more BRGs, and supplying each BRG access to selectable content from one or more of the CSPs according to the content profile.

DETAILED DESCRIPTION OF THE DRAWINGS

Figure 1:
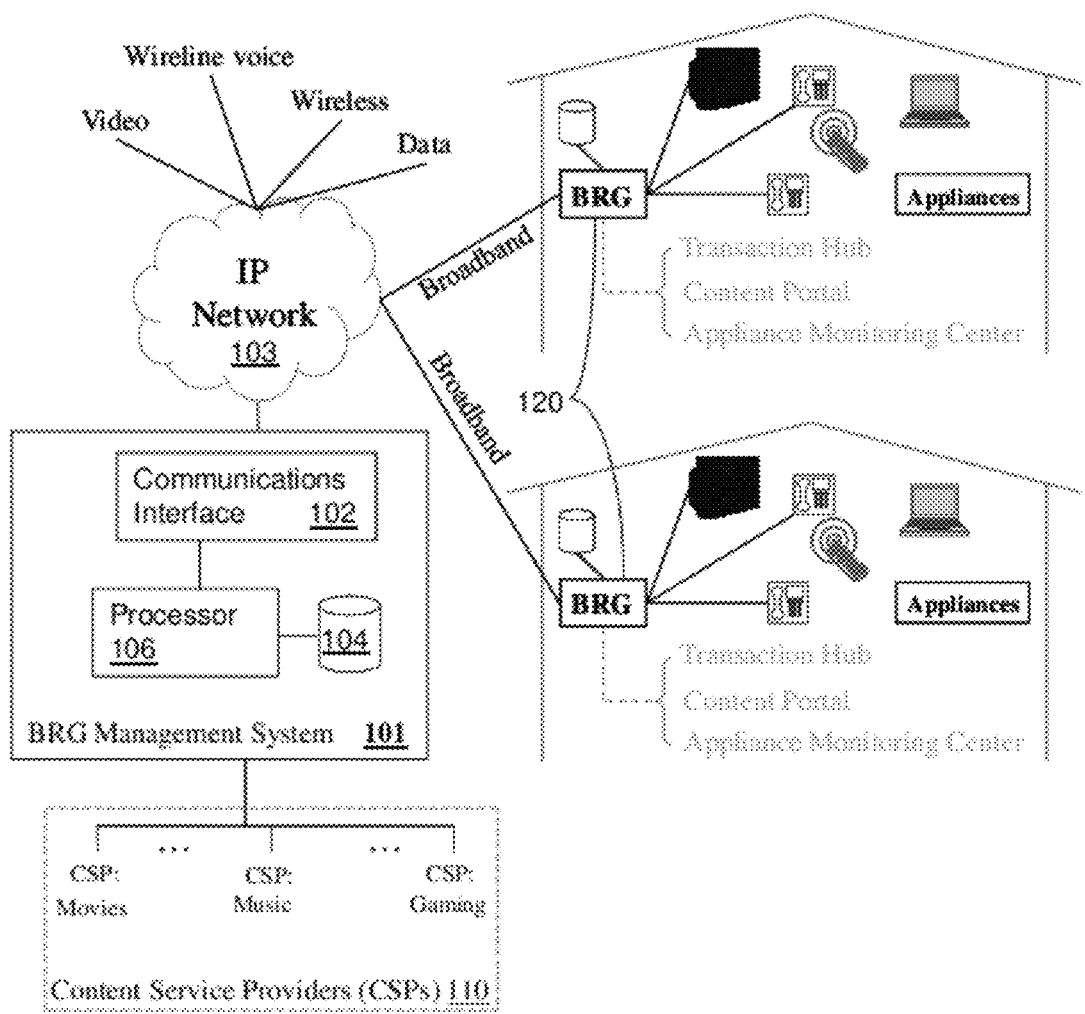
FIG. 1 is block diagram of a broadband residential gateway (BRG) management system operating in a communication system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram 100 of a BRG management system 101 operating in a communication system 100 according to an embodiment of the present invention. The BRG management system 101 comprises conventional technology such as a communications interface 102, a memory 104, and a processor 106. The processor 106 can utilize one or more conventional computers or servers for controlling operations of the BRG management system 101.

The memory 104 utilizes one or more conventional media devices (such as a high capacity disk drive, Flash memory, Dynamic Random Access Memory, floppy disks, or other like memories) for storage purposes, and can be used for managing databases of a service provider of said system 101. The databases can be used for recording information pertinent to managing the communication system 101 such as, for example, billing information, services rendered, services pending, content management, and content profiles (as will be described below), just to mention a few. Said databases can be managed by, for example, a conventional CRM (Customer Relations Management) system.

The communications interface 102 can comprise conventional technology for routing content between content service providers (CSPs) 110 and broadband residential gateways (BRGs) 120 under the control of the processor 106 in accordance with the present invention. CSPs 110 offer limitless services including, for instance, downloadable content services like video, music, gaming, travel services such as car rentals, airplane reservations, and so on. The BRGs 120 can be interconnected to the BRG management system 101 by way of conventional broadband links such as DSL or cable modem coupled to an IP network 103 managed by the service provider of the BRG management system 101.

The BRGs 120 in turn provide consumers access to services by way of a wired or wireless environment in a residence (or home office). BRGs 120 can utilize, for example, conventional wireless technology such as IEEE 802.11 a/b/g (or other like wireless technologies) and/or a wired Ethernet. Through such standard wireless and/or wired interfaces, the BRG 120 can interconnect with VoIP terminals, computers and associated peripherals, televisions, mobile phones, or other media devices, and can serve as a general purpose router for interconnecting and exchanging data between such devices.

BRGs 120 can serve as a transaction hub for multiple users. Depending on the resource capabilities of the BRG 120, said users can be given simultaneous access to VoIP, video on demand, DVR (Digital Video Recording), high speed data transfers, and/or access to general content. Additionally, the BRG 120 can be utilized as an appliance for general applications such as utility control at a residence (or office), time management (such as calendaring) or other features suitable for the present invention. Consumers can acquire BRGs 120 directly from the service provider or its agents.

It should also be noted that the data communication links interconnecting the BRG management system 101 to the CSPs 110 and BRGs 120 can use any conventional data protocol such as IP (Internet Protocol), ATM (Asynchronous Transfer Mode), FR (Frame Relay), and MPLS (Multi-protocol label switching), just to mention a few.

Figure 2:
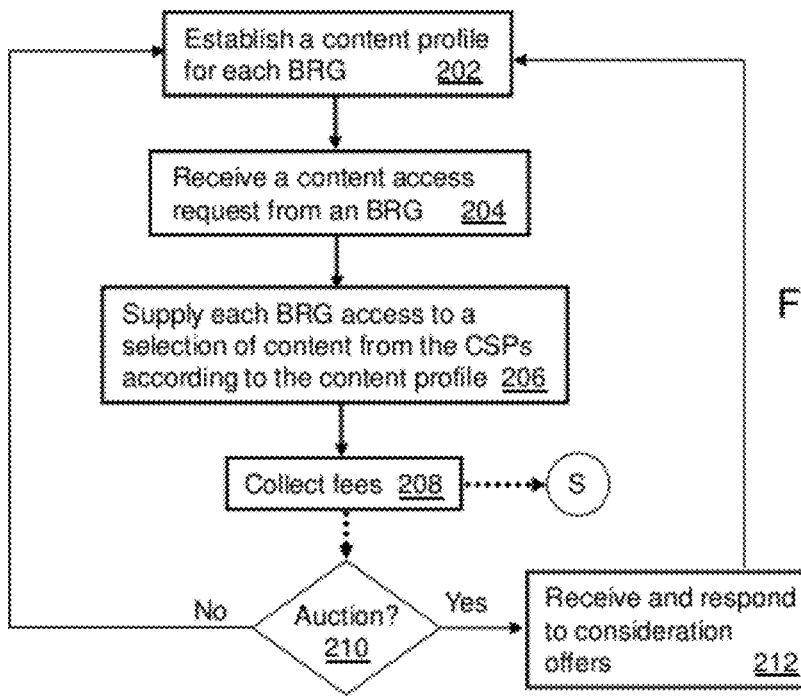
FIGS. 2-4 depict flowcharts of a method operating in the BRG management system according to an embodiment of the present invention.
Figure 3:
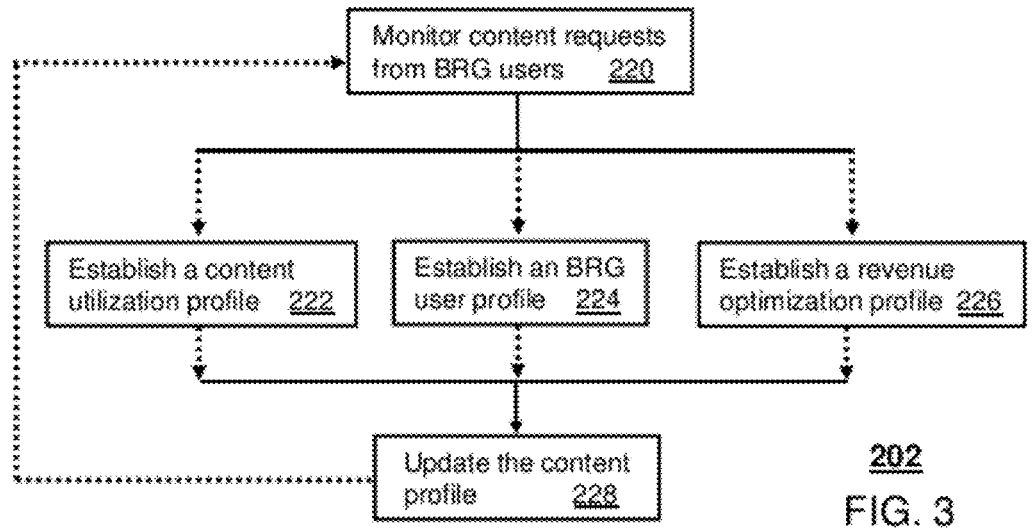
Figure 4:
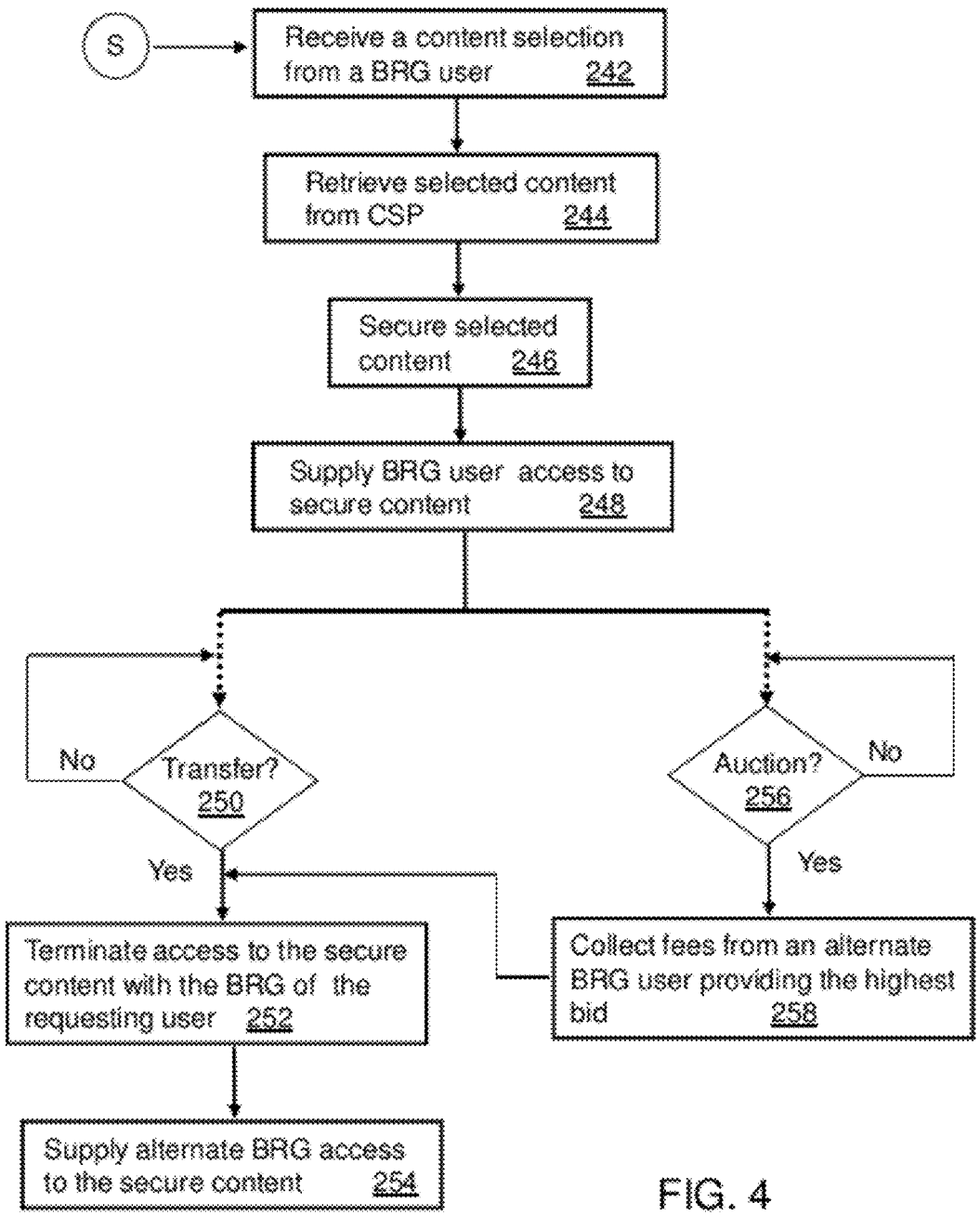

FIGS. 2-4 depict flowcharts of a method 200 operating in the BRG management system 101 according to an embodiment of the present invention. Method 200 provides a means for a service provider of the BRG management system 101 to manage distribution of content between the CSPs 110 and BRGs 120. Ownership of the BRGs 120 and/or CSPs 110 has no bearing on the operation of the BRG management system 101 in accordance with the present invention. Thus, for the discussions that follow, an assumption can be made that the service provider of the BRG management system 101 owns and operates the BRGs 120, but not necessarily the CSPs 110. It would be obvious to an artisan with skill in the art that alternative business arrangements are possible without deviating from the scope of the present invention.

With this in mind, method 200 begins with step 202 where the BRG management system 101 establishes a content profile for each BRG 120 according to one or more attributes of the BRGs 120 and CSPs 110. BRG 120 attributes can be represented by any characteristics relevant to the operation of content delivery. For instance, a BRG 120 attribute can be its location, a density of residential users of the BRG 120, a demographic or psychographic profile of said residential users, and consideration received for services at each of the BRGs 120. Similarly, CSP 110 attributes can include, for example, a content type offered by each of the CSPs, and a presentation ranking of content from each CSP determined according to fees offered and paid for such ranking.

Any of the foregoing attributes can be analyzed by the BRG management system 101 to establish a content profile for each BRG 120. Thus, for example, the BRG management system 101 can be programmed to analyze BRG 120 users by region (region, State, cities, counties, boroughs, etc.), by use behavior, content preference, or any other relevant aspect useful for satisfying the needs of said users and thereby providing the service provider a means for mining revenue. It would be evident therefore to one of ordinary skill in the art that any method for establishing a content profile that can improve quality of service and revenue for the service provider of the BRG management system 101 is suitable for the present invention. It would also be evident to said artisan that the content profile need not be static.

That is, by monitoring the behavior of BRG 120 users while the explore content, a use behavior can be developed and exploited by dynamically adapting the content profile associated with each BRG 120. It should be apparent also that a content profile can be developed for each BRG 120 user, thereby providing a means for micro-segmentation. In either case, the content profile can be continuously or periodically updated so as to optimize revenue opportunities for the service provider of the BRG management system 101.

FIG. 3 illustrates alternative embodiments for establishing dynamic content profiles in accordance with the present invention. It would be obvious to an artisan with skill in the art that these embodiments are not limiting, and that other methods for establishing content profiles are possible, and are therefore should be considered to be within the scope and spirit of the claims described below.

In a first embodiment, step 202 breaks down into step 220 where the BRG management system 101 monitors content requests from BRG 120 users. In this embodiment, a content utilization profile is established in step 222 for each of the BRGs 120 according to the monitored requests. The content utilization profile can be developed by any conventional pattern recognition technique such as statistical demographic and/or psychographic analysis of BRG 120 users on the basis of the content they explore and purchase. In step 228 the content profile of each BRG 120 can be updated according to the content utilization profile. These steps provide one example for dynamically adapting the content profile of a BRG 120 as use behaviors evolve. The foregoing embodiment can be repeated as frequently as needed to remain up to date with trend cycles.

In an aggressive micro-segmentation embodiment, step 220 can be proceeded by step 224 where the BRG management system 101 establishes a BRG user profile according to the monitored requests. Each BRG 120 user can be uniquely identified by an IP address or like identification means. Accordingly, the behavior for each BRG 120 user can be monitored over the course of one or more BRG use sessions. As before, any technique for recognizing a patterned behavior can be used to hone in on the content and/or behavioral needs of each BRG 120 user wherefrom a BRG user profile can be established. The BRG user profile can in turn be used in step 228 to update the content profile of the BRG 120, or a more targeted technique can be used whereby a content profile can be established for each BRG 120 user.

Step 226 illustrates yet a third embodiment where the BRG management system 101 establishes a revenue optimization profile according to the requests monitored at each BRG 120. Any conventional method for mining revenue on the basis of observed behaviors of the BRG 120 users can be used to develop this profile. Once developed, it can be used to update the content profile in step 228 similar to what has been described above.

The content profile developed in step 202 can be updated as a background process for each cycle of the flowchart of FIG. 2 according to the embodiments of FIG. 3 operating singly or in combination (or other embodiments not described herein, but considered to be within the scope of the present invention). Referring back to FIG. 2, the BRG management system 101 in step 204 receives and processes content access requests from the BRGs 120. In step 206, each BRG 120 is supplied access to selectable content from the CSPs 110 according the aforementioned embodiments of the content profile. In step 208, the BRG management system 101 can collect fees from the CSPs 110 according to static prearranged agreements (e.g., service level agreements) and/or dynamic fees collected according to the behavior of BRG 120 users.

For example, fees can be collected for each occurrence of content presented to the BRGs 120, presentation of CSP 110 advertising to the BRGs 120, presentation of CSP 110 services to the BRGs 120, and/or content purchases made by BRG 120 users—just to mention a few. It would be obvious to an artisan with skill in the art that any fee and/or revenue sharing arrangement between the service provider of the BRG management system 101 and the CSPs 110 can be applied to the present invention.

In yet another embodiment, the BRG management system 101 can auction to the CSPs 110 access to BRG 120 users. If auctioning is activated in step 210, the BRG management system 101 can be programmed to receive in step 212 fees offered by the CSPs 110 for access to BRG 120 users, and can thereby respond according to predetermined business criteria established by the service provider of the BRG management system 101. Said criteria can be a simple algorithm such as supplying access according to the highest fee bid by the CSPs 110. Alternatively, more sophisticated criteria can be employed that factor in which CSP 110 is bidding, fees offered, CSP 110 customer satisfaction rating, service agreements with the CSP 110, and so on.

In yet another embodiment, the BRG management system 101 can be programmed according to the steps shown in FIG. 4. In this embodiment, the BRG management system 101 can receive in step 242 a content selection request from a BRG 120 user. In step 244, the BRG management system 101 can retrieve the selected content from one of the CSPs 110, and secures it in step 246. The securing step can be performed according to any conventional means for securing content such as, for example, applying a conventional DRM (Digital Rights Management) method for encrypting digital information thereby providing the CSP 110 copyright protection. DRM can also be used for applying business rules on said content such as, for example, defining a use period, transfer rights, title rights, play limitations, recording limitations, and so on.

In step 248, the BRG 120 user is supplied access to the secured content. The secured content can be stored in the BRG management system 101 or in the targeted BRG 120. In the former embodiment, the BRG management system 101 can serve as a content repository for BRG 120 users. From step 248, the BRG management system 101 can be programmed to proceed to embodiments for transferring or auctioning the secured content.

In the former case, the BRG management system 101 receives in step 250 a request from a BRG 120 user to transfer rights to the secured content (of step 248) to a user of an alternate BRG 120. With the use of DRM (or other conventional security schema), the transfer of rights to the secured content can take on innumerable embodiments. For instance, a BRG 120 user can offer the alternate BRG 120 user temporary access to secured content. Alternatively, the BRG 120 user can relinquish title to the alternate BRG 120 user. Any method for transferring rights in whole or in part which complies with the United States and foreign copyright laws can be utilized in the present invention.

To avoid multiple BRGs 120 access to the secure content, the BRG management system 101 terminates in step 252 access to the secure content with the BRG 120 user requesting the transfer of rights in step 250. This step can take place according to several embodiments. For example, the BRG management system 101 can remove the secured content from the requesting BRG 120 and transfer said content to the alternate BRG 120. Alternatively, the BRG management system 101 can alter the DRM information of the secured content on the requesting BRG 120 so as to prevent access. In an embodiment where the secure content resides at the BRG management system 101, said system can prevent access to the BRG 120 requesting the transfer of rights, and can enable access to the alternate BRG 120. It would be obvious to an artisan with skill in the art that any means for transferring digital content between BRG 120 users in the form of a full or partial transfer (e.g., license) of rights of an originating party can be applied to the present invention.

Once access has been terminate in step 252, the alternate BRG 120 user is supplied access to the secure content in step 254. Access can be localized by storing the secured content in the alternate BRG 120, or remote by supplying access to the content from the BRG management system 101.

In an alternate embodiment, the BRG management system 101 can be further programmed in step 256 to auction the secured content to BRG 120 users for consideration. This step can be an auction for a transfer of title, or limited use. The BRG management system 101 can in step 258 collect a fee from an alternate BRG user providing the highest bid for the secured content. From step 258, the BRG management system 101 can proceed to steps 252 and 254 to complete the transaction as described earlier.

It should be evident by now that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 200 described above is suitable for the present invention.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident from the embodiments of FIGS. 2-4 that the present invention may be used for many applications. Thus, although the description is made for particular arrangements and methods, the intent and concept of the invention is suitable and applicable to other arrangements and applications not described herein. For example, method 200 can be reduced to steps 202, 204, and 206 without departing from the claimed invention. It would be clear therefore to those skilled in the art that modifications to the disclosed embodiments described herein could be effected without departing from the spirit and scope of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, other re-writable (volatile) memories or Signals containing instructions. A digital file attachment to e-mail or other self-contained information archive or set of archives sent through signals is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A server device configured to be coupled to a plurality of broadband residential gateways and a content service provider, the server device comprising a memory storing computer instructions and a controller circuit coupled with the memory, wherein the controller circuit responsive to executing the computer instructions performs operations comprising:
    establishing a content profile for each of the broadband residential gateways according to attributes of the broadband residential gateways and the content service provider;
    receiving a content access request from at least one of the broadband residential gateways;
    providing each broadband residential gateway access to selectable content from the content service provider according to the corresponding content profile;
    establishing a content utilization profile for each of the broadband residential gateways according to content requests at each of the broadband residential gateways;
    establishing a broadband residential gateway user profile for each broadband residential gateway user according to the content requests at each of the broadband residential gateways;
    establishing a revenue optimization profile for each of the broadband residential gateways according to the content requests at each of the broadband residential gateways;
    dynamically adjusting the content profile of each of the broadband residential gateways according to the content utilization profile, the broadband residential gateway user profiles, and the revenue optimization profile, wherein the content profile of each of the broadband residential gateways is continuously updated;
    auctioning access to broadband residential gateway users of at least one of the broadband residential gateways;
    receiving consideration offers from the content service provider for said access; and
    responding to the consideration offers according to predetermined business criteria.

2. The server device of claim 1, wherein the controller circuit is programmed to establish content presentation rankings of the content service provider according to the consideration offers accepted.

3. The server device of claim 1, wherein the attributes of the broadband residential gateways comprise at least one among a location, a density of residential users of a broadband residential gateway, or a demographic profile of said residential users.

4. The server device of claim 1, wherein the attributes of the broadband residential gateways comprise consideration received for services at each of the broadband residential gateways.

5. The server device of claim 1, wherein the attributes are at least one among a group of content service provider attributes comprising a content type offered by content service provider, and a presentation ranking given to the content service provider according to consideration paid thereby.

6. The server device of claim 1, wherein the controller circuit is programmed to collect consideration from at least one among the content service provider and the broadband residential gateways upon at least one among a group of events comprising presenting content to the broadband residential gateway users, presenting content service provider advertising to the broadband residential gateway users, presenting content service provider services to the broadband residential gateway users, or broadband residential gateway users purchasing content from the content service providers.

7. The server device of claim 1, wherein the controller circuit is programmed to:
    auction secured content with the broadband residential gateway users for consideration at the request of the user;
    collect consideration from an alternate broadband residential gateway user providing the highest bid for the secured content;
    terminate access to the secured content with the broadband residential gateway of the requesting user; and
    supply the alternate broadband residential gateway access to the secured content.

8. A method operating in a network having a plurality of broadband residential gateways and being coupled with one or more content service providers, the method comprising:
    obtaining a content profile for each of the broadband residential gateways, the content profiles being based on one or more attributes of the broadband residential gateways and the content service providers;
    obtaining a content utilization profile for each of the broadband residential gateways, the content utilization profile being based on content requests at each of the broadband residential gateways;
    obtaining a broadband residential gateway user profile for each broadband residential gateway user, the broadband residential gateway user profile being based on the content requests at each of the broadband residential gateways;
    obtaining a revenue optimization profile for each of the broadband residential gateways, the revenue optimization profile being based on the content requests at each of the broadband residential gateways;
    utilizing a processor for dynamically adjusting the content profile of each of the broadband residential gateways according to the content utilization profile, the broadband residential gateway user profiles, and the revenue optimization profile, wherein the content profile of each of the broadband residential gateways is continuously updated;
    receiving a content access request from one or more of the broadband residential gateways; and
    providing each broadband residential gateway access to selectable content from one or more of the content service providers according to the corresponding content profile, wherein the one or more attributes are at least one among a group of broadband residential gateway attributes comprising a location, a density of residential users of a broadband residential gateway, a demographic or psychographic profile of said residential users, or consideration received for services at each of the broadband residential gateways, and wherein the one or more attributes are at least one among a group of content service provider attributes comprising a content type offered by each of the content service providers, or a presentation ranking given to each of the content service providers according to consideration paid thereby; and establishing content presentation rankings of the content service providers according to the consideration received.

9. The method of claim 8, comprising:
auctioning access to broadband residential gateway users of at least one of the broadband residential gateways;
receiving consideration offers from the content service providers for said access; and
responding to the consideration offers according to predetermined business criteria.

10. The method of claim 8, comprising:
auctioning access to broadband residential gateway users of at least one of the broadband residential gateways;
receiving consideration offers from the content service providers for said access;
responding to the consideration offers according to predetermined business criteria;
receiving a content selection from a user of a corresponding broadband residential gateway;
retrieving the selected content from a corresponding content service provider;
securing the selected content;
supplying the broadband residential gateway access to the secured content;
receiving a request from the user to transfer rights to the secured content to a user of an alternate broadband residential gateway;
terminating access to the secured content with the broadband residential gateway of the requesting user; and
supplying the alternate broadband residential gateway access to the secured content.

11. The method of claim 8, comprising computer instructions for collecting consideration from at least one among the content service-providers or the broadband residential gateways upon at least one among a group of events comprising presenting content to the broadband residential gateway users, presenting content service provider advertising to the broadband residential gateway users, presenting content service provider services to the broadband residential gateway users, or broadband residential gateway users purchasing content from the content service providers.

12. A non-transitory computer-readable storage medium, comprising computer instructions for:
communicating with a plurality of broadband residential gateways and one or more content service providers;
establishing a content profile for each of the broadband residential gateways based on one or more attributes of the broadband residential gateways and the content service providers;
establishing a content utilization profile for each of the broadband residential gateways based on content requests at each of the broadband residential gateways;
establishing a broadband residential gateway user profile for each broadband residential gateway user based on the content requests at each of the broadband residential gateways;
establishing a revenue optimization profile for each of the broadband residential gateways based on the content requests at each of the broadband residential gateways;
dynamically adjusting the content profile of each of the broadband residential gateways according to the content utilization profile, the broadband residential gateway user profiles, and the revenue optimization profile, wherein the content profile of each of the broadband residential gateways is continuously updated;
receiving a content access request from one or more of the broadband residential gateways;
providing each broadband residential gateway access to selectable content from one or more of the content service providers according to the corresponding content profile;
auctioning access to broadband residential gateway users of at least one of the broadband residential gateways;
receiving consideration offers from the content service providers for said access; and
responding to the consideration offers according to predetermined business criteria.

13. The non-transitory storage medium of claim 12, comprising computer instructions for:
receiving a content selection from a user of a corresponding broadband residential gateway;
retrieving the selected content from a corresponding content service provider;
securing the selected content;
supplying the broadband residential gateway access to the secured content;
receiving a request from the user to transfer rights to the secured content to a user of an alternate broadband residential gateway;
terminating access to the secured content with the broadband residential gateway of the requesting user; and
supplying the alternate broadband residential gateway access to the secured content.

14. The non-transitory storage medium of claim 12, wherein the one or more attributes of the broadband residential gateways comprise at least one among a location, a density of residential users of a broadband residential gateway, or a demographic profile of said residential users.

15. The non-transitory storage medium of claim 12, wherein the one or more attributes of the broadband residential gateways comprise consideration received for services at each of the broadband residential gateways.

16. The non-transitory storage medium of claim 12, wherein the one or more attributes are at least one among a group of content service provider attributes comprising a content type offered by each of the content service providers, or a presentation ranking given to each of the content service providers according to consideration paid thereby.

17. The non-transitory storage medium of claim 12, comprising computer instructions for:
establishing content presentation rankings of the content service providers according to the received consideration offers that have been accepted.

18. The non-transitory storage medium of claim 12, comprising computer instructions for collecting consideration from at least one among the content service providers or the broadband residential gateways upon at least one among a group of events comprising presenting content to the broadband residential gateway users, presenting content service provider advertising to the broadband residential gateway users, presenting content service provider services to the broadband residential gateway users, or broadband residential gateway users purchasing content from the content service providers.

* * * * *